United States Patent
Chandran et al.

(10) Patent No.: US 9,959,234 B2
(45) Date of Patent: May 1, 2018

(54) MULTIGIG SOLUTION ON CONVENTIONAL SGMII AND XFI CAPABLE SYSTEM

(71) Applicant: Cisco Technology, Inc., San Jose, CA (US)

(72) Inventors: Ajith Chandran, San Jose, CA (US); Kabiraj Sethi, San Jose, CA (US); Chandra Sekhara Rao Vempali, Bangalore (IN); Neha Agarwal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 14/839,522

(22) Filed: Aug. 28, 2015

(65) Prior Publication Data

US 2017/0017597 A1   Jan. 19, 2017

(30) Foreign Application Priority Data

Jul. 16, 2015   (IN) .............................. 3641/CHE2015

(51) Int. Cl.
*H04L 12/56* (2006.01)
*G06F 13/40* (2006.01)
*G06F 13/42* (2006.01)

(52) U.S. Cl.
CPC ...... *G06F 13/4022* (2013.01); *G06F 13/4221* (2013.01)

(58) Field of Classification Search
CPC ....................................................... H04L 12/56
See application file for complete search history.

(56) References Cited

U.S. PATENT DOCUMENTS

| 7,826,360 | B1* | 11/2010 | Hutchison | H04L 63/0428 370/230 |
| 2005/0271064 | A1* | 12/2005 | Chang | H04W 88/06 370/397 |
| 2010/0287303 | A1* | 11/2010 | Smith | H04L 47/10 709/235 |
| 2015/0282086 | A1* | 10/2015 | Gupta | H04W 52/0229 455/574 |

* cited by examiner

*Primary Examiner* — Farley Abad
(74) *Attorney, Agent, or Firm* — Merchant & Gould P.C.

(57) ABSTRACT

Methods and systems are disclosed which may provide MultiGig capability to a system where a physical layer device (PHY) or a network device does not have the capacity to support all available line speeds while operating in a single system-interface mode between MAC and PHY devices.

20 Claims, 5 Drawing Sheets

MULTIGIG SOLUTION ON CONVENTIONAL SGMII AND XFI CAPABLE SYSTEM

CROSS-REFERENCE TO RELATED APPLICATION

This application claims priority to Indian Patent Application No. 3641/CHE/2015, filed Jul. 16, 2015, which is entirely incorporated herein by reference.

TECHNICAL FIELD

The present disclosure relates generally to providing MultiGig capability, specifically, providing MultiGig capability to a system where a physical layer or a network device does not have the capacity to support all available line speeds while operating in a single system-interface mode.

BACKGROUND

Conventional switching systems may use 10G Form Factor Pluggable standard interface (XFI) or 10G Attachment Unit Interface (XAUI) as a system interface mode between a physical layer (PHY) and a media access control (MAC) layer. XFI and XAUI may provide support for 10G line speed. Serial Gigabit Media Independent Interface (SGMII) and Quad SGMII (QSGMII) interfaces may be used to support 10/100/1000 Mbit/s switching.

Switching systems employing MultiGig capability may provide for transmitting data varying between multiple variable rates, such as 100M, 1G, 2.5G, 5G, and 10G. This has created a need for system interfaces to support all the line speeds seamlessly. Multigig PHYs and other conventional network devices may not support all the line speeds in a single system interface mode such as XFI, XAUI, SGMII, and QSGMII. This may result in the line-side going down to accommodate a switching instruction.

Some prior line cards, such as 4K line cards may employ Small-form Factor Pluggable (SFP) optic modules to change a system interface mode between MAC and PHY devices based on whether the SFP is set to 1G or 10G. However, such prior line cards do not provide line-side auto-negotiation. Such approaches do not work with copper lines, as the line-side must remain up during the system interface mode change.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
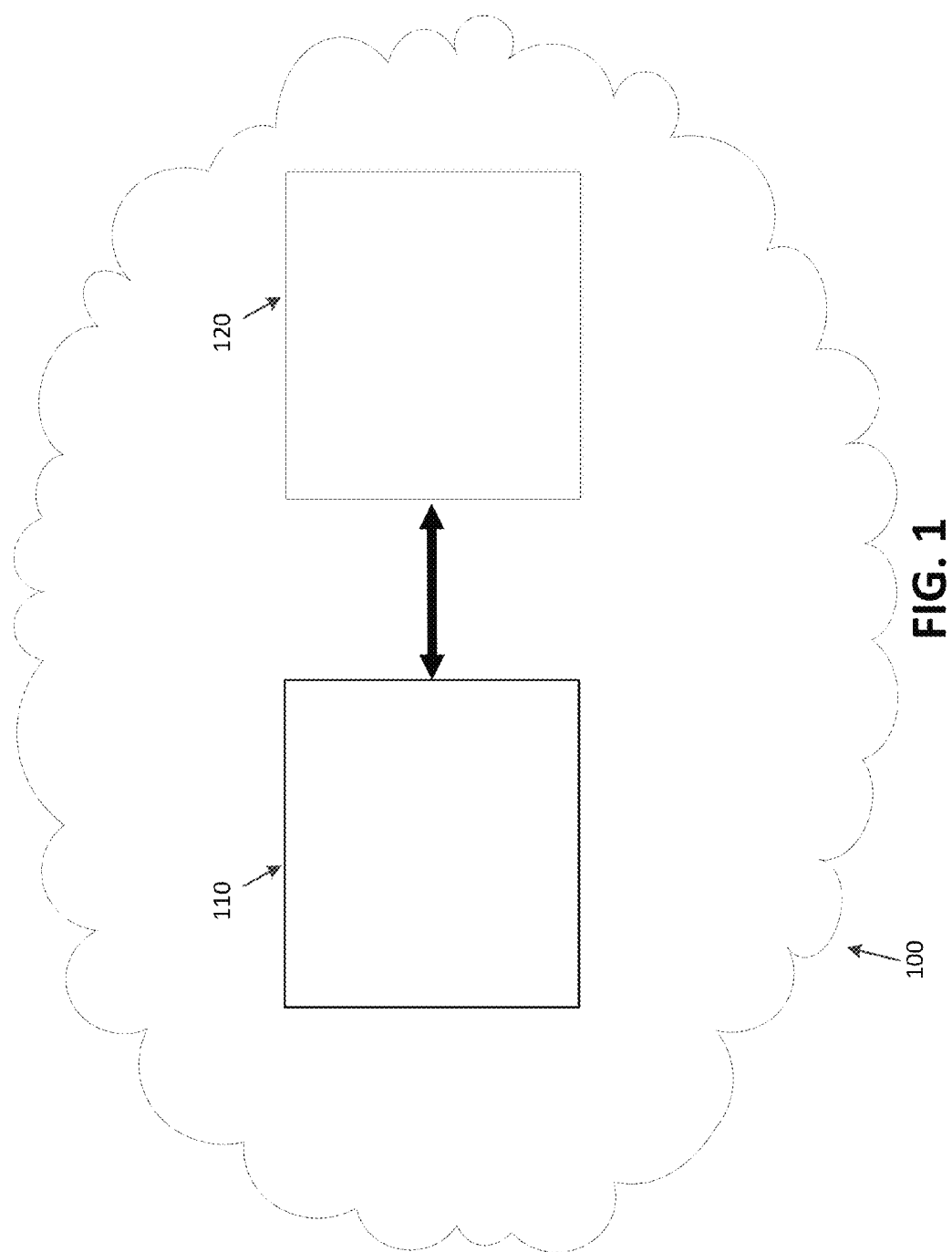
FIG. 1 illustrates a sample network embodiment that may support embodiments of the present invention.

Methods and systems are disclosed which can perform embodiments including configuring a MultiGig PHY and a MAC ASIC at a lower system interface mode upon initialization of a network device comprising the MultiGig PHY and the MAC ASIC. A line speed may then be determined for a link from the MultiGig PHY after the line-side MDI link comes up on the MultiGig PHY. The MultiGig PHY and the MAC ASIC may then be reconfigured to a higher system interface mode if the line speed is greater than a default speed.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates a sample network topology that will be used in the following description to illustrate embodiments of the present disclosure. The described network topology may exist in a networking environment 100. For example, networking environment 100 may be any type of system that transmits data packets over a network. As an example, networking environment 100 may be an environment enabled to provide voice communications, and video and data services.

Networking environment 100 may be based on a bi-directional transfer of packet based service, such as Internet Protocol (IP) traffic, between any number of network devices, such as network device 110 and network device 120. Networking environment 100 may further include a plurality of gateways (not shown), for example, but not limited to cable modems, routers, switches, set top boxes, and computers. Networking environment 100 may include any combination of wide area networks (WANs), local area networks (LANs), or other networks suitable for packet-type communications, such as Internet communications.

Networking environment 100 may be designed to transmit a stream of data packets from one network device to other network devices. Networking environment 100 may comprise any number of network devices both inside and outside the confines of a fabric. Network devices may be routers, bridges, fabric edge nodes, or other network devices capable of receiving and transmitting a data stream from a source network device to a destination network device. Specifically, in embodiments of the present disclosure any of the described network devices may operate the disclosed embodiments of the present disclosure.

Figure 2:
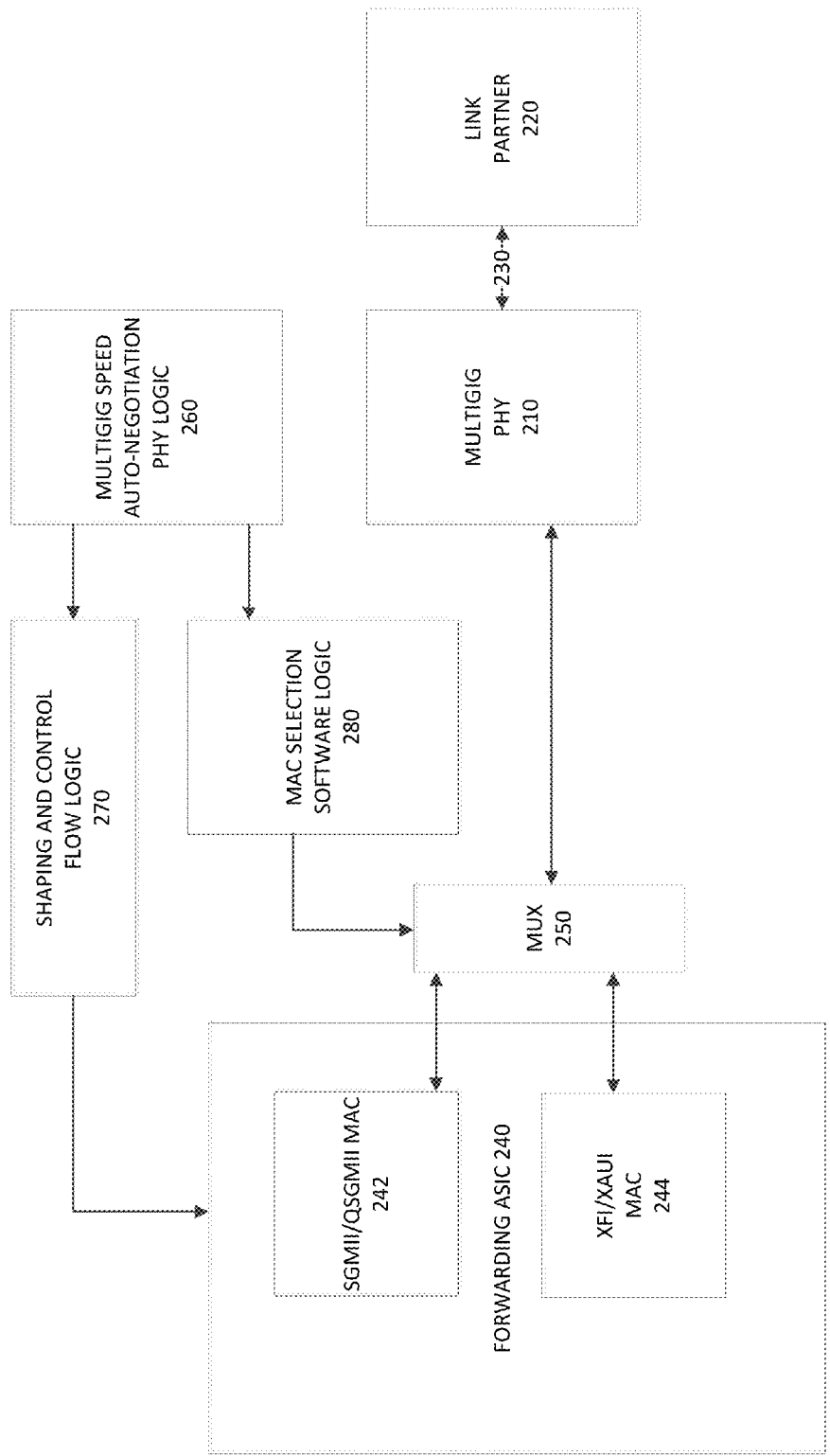
FIG. 2 illustrates a switching network device 200 operating in accordance with embodiments of the present disclosure.

FIG. 2 illustrates a switching network device operating in accordance with embodiments of the present disclosure. The switching network device may be found within networking environment 100. Network devices generally are discussed in further detail in regards to FIG. 3.

A MultiGig PHY 210 may be on a network device connected to one or more remote network devices. For example MultiGig 210 may be connected to a link partner 220 over an Ethernet cable 230. In some embodiments of the present disclosure, Ethernet cable 230 may be a Cat 5e, Cat6, or Cat6a cable. The network device comprising MultiGig PHY 210 may further comprise a CPU capable of running software to execute embodiments of data rate selection. MultiGig PHY 210 may be in communication with a forwarding Application-Specific Integrated Circuit (ASIC) 240 through a multiplexer (MUX), such as MUX 250.

Forwarding ASIC 240 may comprise a SGMII/QSGMII MAC 242 and a XFI/XAUI MAC 244 in communication with MultiGig PHY 210. ASIC 240 may be further connected to MultiGig speed auto-negotiation PHY logic 260 through shaping and control flow logic 270. MultiGig speed auto-negotiation PHY logic 260 may then be in communication with MAC selection software logic 280.

Upon powering up and initializing MultiGig PHY 210, a system interface on both MultiGig PHY 210 and ASIC 240 may be initialized to a lower power mode. In some embodiments, the lower power mode may be SGMII operated through SGMII/QSGMII MAC 242. Auto-negotiation may be used at this point to resolve the speed of line 230. For example, the auto-negotiation may resolve the speed as one of: 100M, 1 G, 2.5G, and 5G on Cat 5e cable and up to 10G over Cat 6a cabling.

If the resolved speed is 2.5G or higher (i.e., 5G and 10G), the system interface may be configured on both MultiGig PHY 210 and ASIC 240 to XFI/XAUI MAC 244 without impacting the line-side. This may allow a Media Dependent Interface (MDI) line, such as line 230 to remain up on a line card during a system interface change. In some embodiments of the present disclosure, if the resolved speed is 100M or 1 G, then no changes may be required for the system interface mode. In embodiments of the present disclosure where the line side does go down, the system interface on MultiGig PHY 210 and ASIC 240 may be moved to SGMII through SGMII/QSGMII MAC 242 if not already in that mode.

Figure 3:
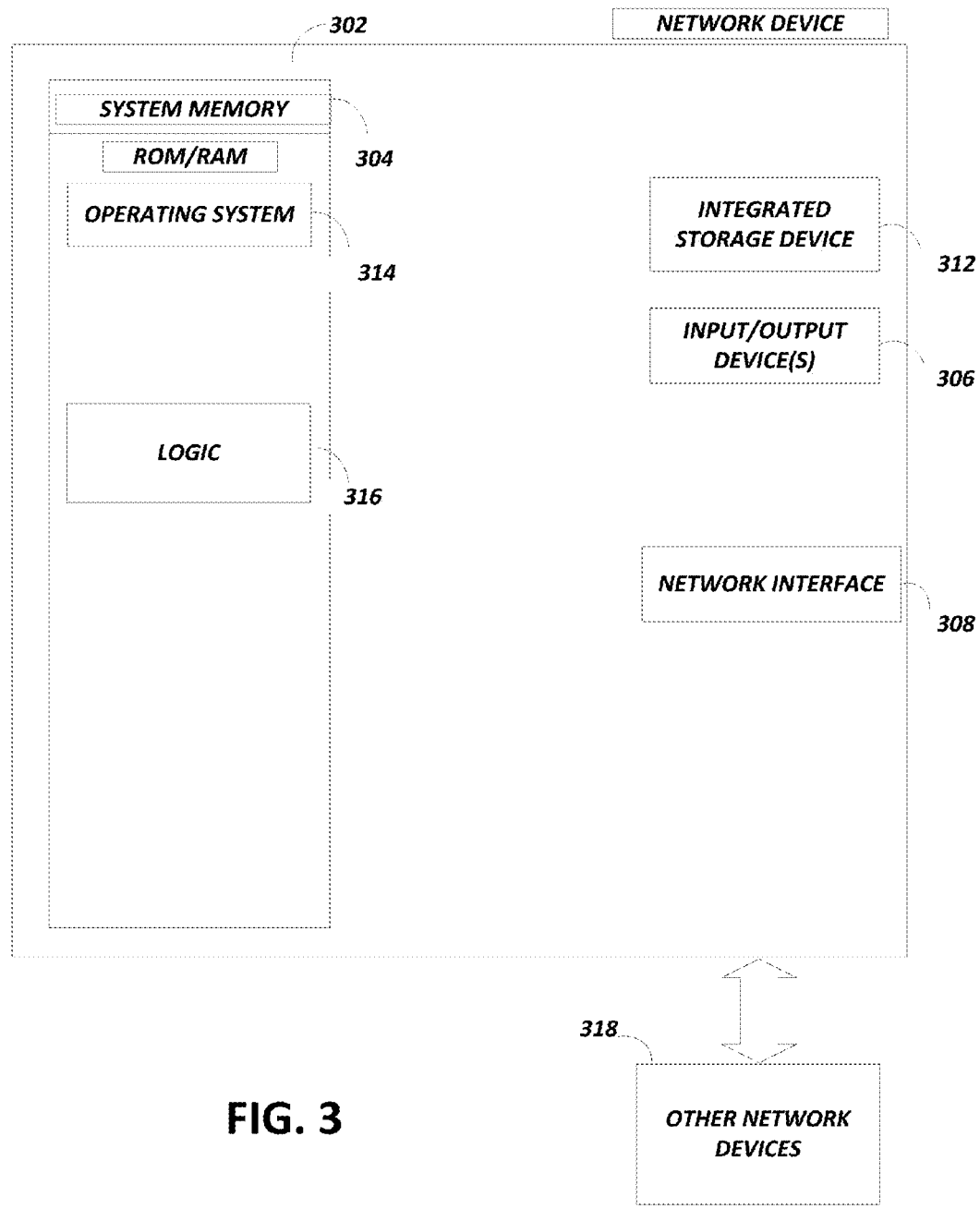
FIG. 3 shows a network device in greater detail.

FIG. 3 shows a network device (such as network device 110) in greater detail. A network device may include a processing device 802, a memory 304, input/output (I/O) devices 306, and a network interface 308, each of which may be communicatively coupled via a local interface (not shown). Processing device 302 may be a hardware device for executing software, particularly that which is stored in memory 304. Processing device 302 may be any custom made or commercially available processor, a central processing unit (CPU), an auxiliary processor among several processors, a semiconductor-based microprocessor (in the form of a microchip or chip set), a microprocessor, or generally any device for executing software instructions. Software executed by processing device 302 may include software at least capable of operating described embodiments of the present disclosure.

Network interface 308 may include one or more devices that communicate both inputs and outputs, for instance but not limited to, a modulator/demodulator (modem for accessing another device, system, or network), a radio frequency (RF) transceiver or other type of transceiver, a bridge, a router, etc.

I/O devices 306 may include input devices, for example but not limited to, a keyboard, mouse, scanner, microphone, etc. Furthermore, the I/O devices 206 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 310 may include address, control, and/or data connections to enable appropriate communications among the aforementioned components and provides the interface to communicate with a network controller, a host tracking database, a fabric edge router, or any number of other network devices in a networking environment.

In some embodiments, a network device may further be configured with an integrated storage device 312 coupled to local interface 310. Storage device 312 may be configured to buffer a plurality of data packets. One or more such buffers may be dedicated buffers for storing captured packets. In some embodiments, storage device 312 may be externally coupled to a content server (not shown).

Memory 304 may include a suitable operating system (O/S) 314. Operating system 314 essentially may control the execution of other computer programs, such as scheduling, input-output control, file and data management, memory management, and communication control and related services. Logic 316 may include executable code to send service requests to the local system, the remote system, a fabric edge router, or any number of other network devices in a networking environment.

Memory 304 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 304 may incorporate electronic, magnetic, optical, semi-conductive, and/or other types of storage media. Note that memory 304 may have a distributed architecture, where various components are situated remotely from one another, which can be accessed by the processing device 302.

The software in memory 304 may include one or more separate programs, each of which comprises an ordered listing of executable instructions for implementing logical functions. In the embodiment shown in FIG. 3, the software in memory 304 may include operating system 314 and logic 316, as explained above. Functionality of logic 316 may be implemented using a single module, or distributed among a plurality of modules.

When logic 316 is in operation, processing device 302 may be configured to execute logic 316 stored within memory 304, to communicate data to and from memory 304, and to generally control operations of logic 316. Logic 316 and O/S 314, in whole or in part, but typically the latter, are read by processing device 302, perhaps buffered within processing device 302, and then executed.

The network controller may include a communication interface suitable for enabling communication (e.g., TCP/IP) of data packets with other network devices 318 of a network environment. For instance, the communication interface may be of a type suitable for communication over an IP network, a coaxial cable network, an HFC network, and/or wireless network, among others.

Figure 4:
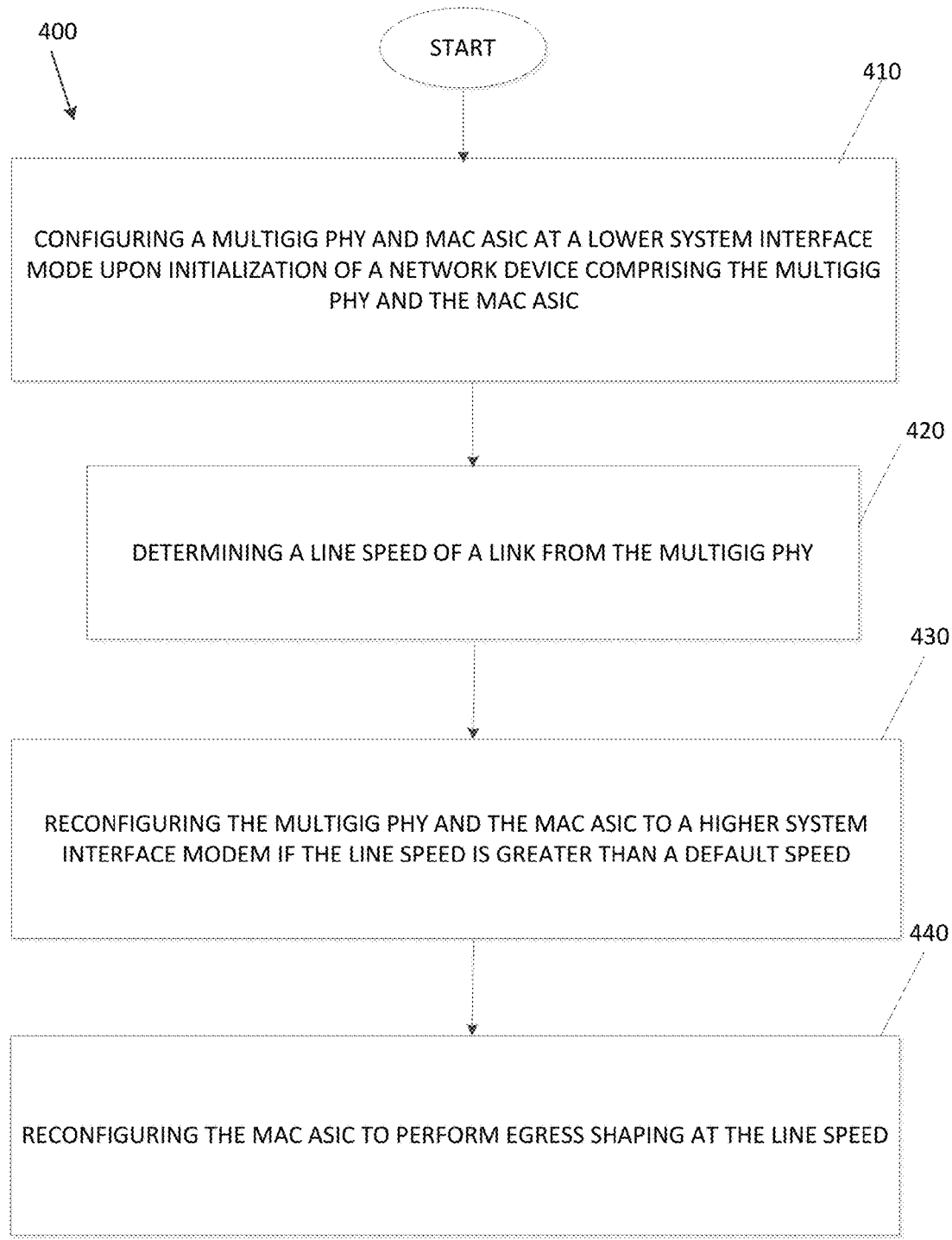
FIG. 4 illustrates methods implemented by one or more network devices according to embodiments of the present disclosure.

Having described various components of certain embodiments of the present disclosure, a method 400 implemented by one or more network devices employed on a network environment will now be described with reference to FIG. 4. Method 400 may begin at step 410 where a MultiGig PHY and a MAC ASIC may be configured at a lower system interface mode upon initialization of a network device comprising the MultiGig PHY and the MAC ASIC.

In some embodiments of the present disclosure, the lower system interface mode may be SGMII/QSGMII. Furthermore, in some embodiments, the MAC ASIC may be initially configured to perform egress shaping at a default speed. For example, the default speed may be 1 G.

Method 400 may proceed to step 420. At step 420 a line speed of a link from the MultiGig PHY may be determined. In some embodiments, the line speed may be determined by an auto-negotiation process. In other embodiments, the line speed may be set be forced speed protocols and rules.

Subsequently, method 400 may proceed to step 430, where the MultiGig PHY and the MAC ASIC may be reconfigured to a higher system interface mode if the line speed is greater than a default speed. In some embodiments of the present disclosure, the higher system interface mode may be XGMII/XAUI/XFI. Finally, at step 440, the MAC ASIC may be re-configured to perform egress shaping at the line speed. In some embodiments of the present disclosure, the status of the link may be reported to a remote network device.

In some embodiments of the present disclosure, pause frame flow-control may be enabled between the MAC ASIC and the MultiGig PHY. Pause frame flow-control may be achieved by employing pause frames, as defined by the Institute of Electrical and Electronics Engineers (IEEE) within the MultiGig PHY. In such embodiments, when the MultiGig PHY gets more egress traffic from the MAC ASIC than it can handle, pause frames may be generated and transmitted to the MAC ASIC. The MAC ASIC may then implement a slow-down.

Figure 5:
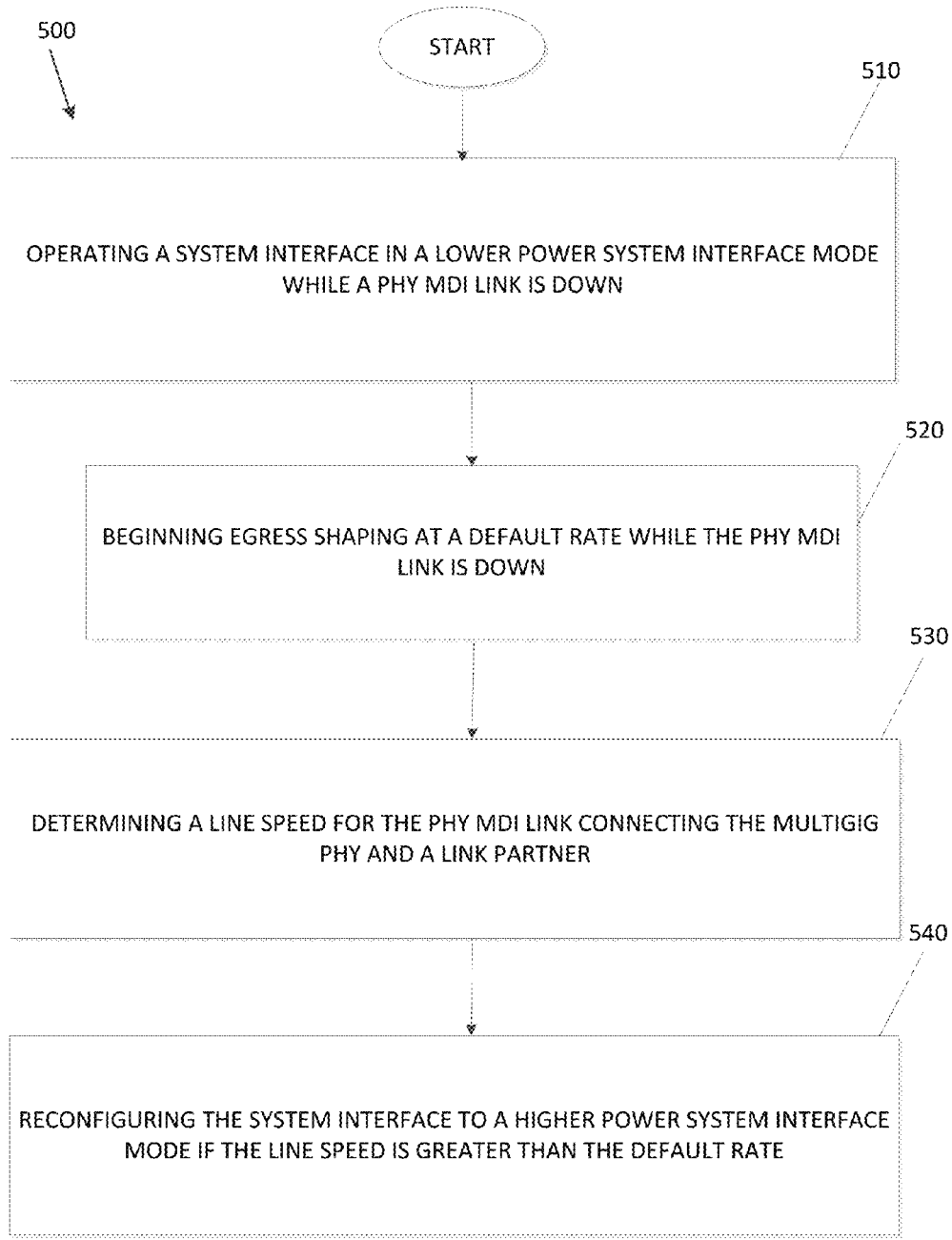
FIG. 5 illustrates methods implemented by one or more network devices according to embodiments of the present disclosure.

Having described various components of certain embodiments of the present disclosure, a method 500 implemented by one or more network devices employed on a network environment will now be described with reference to FIG. 5. Method 500 may begin at step 510 where a system interface may be operated in a lower power system interface mode while a PHY MDI link is down. The system interface may operate between a MAC ASIC and a MultiGig PHY.

Method 500 may proceed to step 520. At step 520, egress shaping may begin at a default rate while the PHY MDI link is down. Next, method 500 may proceed to step 530 where a line speed may be determined for the PHY MDI link connecting the MultiGig PHY and a link partner when the PHY MDI link comes up. When the PHY MDI comes up, egress shaping may be performed at the line speed.

Method 500 may conclude at step 540 where the system interface may be reconfigured to a higher power system interface mode if the line speed is greater than the default rate. In some embodiments of the present disclosure, the PHY MDI may stay up during the reconfiguration of the system interface. For example, a link partner may observe the PHY MDI as up during the reconfiguration of the system interface.

Some embodiments of the present disclosure may avoid congestion between the MAC ASIC and the MultiGig PHY with shaping and flow control software logic. Such congestion may be avoided through the use of pause frames. Where pause frames are not used, the system interface may cause either of the MAC ASIC and the MultiGig PHY to become overloaded. This may result in the dropping of packets. For example, the MAC ASIC may comprise a receive buffer. When the receive buffer becomes filled, the MAC ASIC may generate pause frames to send to the MultiGig PHY. The MultiGig PHY may then be expected to stop or reduce transmissions for an interval time indicated by the pause frame.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
configuring a network device comprising a MultiGig PHY and a media access control (MAC) application specific integrated circuit (ASIC), wherein configuring the network device comprises configuring the network device at a lower system interface mode upon initialization of the network device, wherein the MultiGig PHY and the MAC ASIC are connected via a system interface, wherein the MAC ASIC comprise a first MAC operable at a first speed and a second MAC operable at a second speed, and wherein configuring the network device further comprises configuring the system interface at the first speed;
determining a line speed of a link from the MultiGig PHY;
determining that the line speed is greater than a predetermined speed;
reconfiguring both the MultiGig PHY and the MAC ASIC to a higher system interface mode in response to determining that the line speed is greater than the predetermined speed;
reconfiguring the system interface to the second speed; and
reconfiguring the MAC ASIC to perform egress shaping at the line speed.

2. The method of claim 1, further comprising configuring the MAC ASIC to perform egress shaping at the default speed.

3. The method of claim 1, wherein the default speed is 1G.

4. The method of claim 1, further comprising determining the line speed from an auto-negotiation.

5. The method of claim 1, further comprising determining the line speed from a forced speed procedure.

6. The method of claim 1, wherein the lower system interface mode is one of the following: a serial gigabit media independent interface (SGMII) and a quad SGMII (QSGMII).

7. The method of claim 1, wherein the higher system interface mode is one of the following: a form factor pluggable interface (XFI), an attachment unit interface (XAUI), and a media independent interface (XGMII).

8. The method of claim 1, further comprising enabling pause frame flow-control between the MAC ASIC and the MultiGig PHY.

9. The method of claim 1, further comprising reporting a status of the link.

10. A method comprising:
operating a system interface in a lower power system interface mode while a PHY media dependent interface (MDI) link is down, wherein the system interface operates between a media access control (MAC) application specific integrated circuit (ASIC) and a MultiGig PHY, and wherein the MAC ASIC comprise a first MAC operable at a first speed and a second MAC operable at a second speed;
egress shaping at a default rate while the PHY MDI link is down;
determining a line speed for the PHY MDI link connecting the MultiGig PHY and a link partner when the PHY MDI link comes up;
determining that the line speed is greater than a predetermined speed;
reconfiguring the system interface to a higher power system interface mode if the line speed in response to determining that greater than the predetermined rate;
reconfiguring both the MAC ASIC and the MultiGig PHY to the second speed; and
reconfiguring the MAC ASIC to perform egress shaping at the line speed.

11. The method of claim 10, wherein the PHY MDI stays up during the reconfiguration of the system interface.

12. The method of claim 10, wherein a link partner observes the PHY MDI as up during the reconfiguration of the system interface.

13. The method of claim 10 further comprising: performing egress shaping at the line speed.

14. The method of claim 10, further comprising:
avoiding congestion between the MAC ASIC and the MultiGig PHY with shaping and flow control software logic.

15. The method of claim 14, wherein congestion is avoided through the use of pause frames.

16. A system comprising:
a memory;
a processor capable of executing instructions stored on the memory, the instructions comprising:
configuring a network device comprising a MultiGig PHY and a media access control (MAC) application specific integrated circuit (ASIC), wherein configuring the network device comprises configuring the network device at a lower system interface mode upon initialization of the network device, wherein the MultiGig PHY and the MAC ASIC are connected via a system interface, wherein the MAC ASIC comprise a first MAC operable at a first speed and a second MAC operable at a second speed, and wherein configuring the network device further comprises configuring the system interface at the first speed;
determining a line speed of a link from the MultiGig PHY;
determining that the line speed is greater than a predetermined speed;
reconfiguring both the MultiGig PHY and the MAC ASIC to a higher system interface mode in response to determining that the line speed is greater than the predetermined speed;
reconfiguring the system interface to the second speed; and
reconfiguring both the MAC ASIC to perform egress shaping at the line speed on a Media Dependent Interface (MDI) side.

17. The system of claim 16, wherein the MAC ASIC comprises:
a serial gigabit media independent interface/quad GMII (SGMII/QSGMII) MAC; and
a form factor pluggable interface/an attachment unit interface (XFI/XAUI) MAC.

18. The system of claim 17, wherein the SGMII/QSGMII MAC operates the lower system interface mode.

19. The system of claim 17, wherein the XFI/XAUI MAC operates the higher system interface mode.

20. The system of claim 17, wherein the instructions further comprise: enabling pause frame flow-control between the MAC ASIC and the MultiGig PHY.

* * * * *